United States Patent
Chang

(10) Patent No.: US 11,215,233 B1
(45) Date of Patent: Jan. 4, 2022

(54) ROTATING SPINDLE CAPABLE OF CONDUCTIVELY CONTACTING VIA BEARINGS

(71) Applicant: Chia-Hao Chang, Taichung (TW)

(72) Inventor: Chia-Hao Chang, Taichung (TW)

( * ) Notice: Subject to any disclaimer, the term of this patent is extended or adjusted under 35 U.S.C. 154(b) by 0 days.

(21) Appl. No.: 17/033,932

(22) Filed: Sep. 28, 2020

(51) Int. Cl.
| | |
|---|---|
| *F16C 41/00* | (2006.01) |
| *H01R 39/64* | (2006.01) |
| *F16C 19/18* | (2006.01) |

(52) U.S. Cl.
CPC .......... *F16C 41/002* (2013.01); *F16C 19/183* (2013.01); *H01R 39/643* (2013.01)

(58) Field of Classification Search
CPC ...... F61C 41/002; F61C 41/00; F61C 19/183; F61C 19/181; F61C 19/18; F61C 19/02; F61C 19/00; H01R 39/643; H01R 39/64; H01R 39/60
USPC .......................................................... 439/17
See application file for complete search history.

(56) References Cited

U.S. PATENT DOCUMENTS

| | | | | |
|---|---|---|---|---|
| 5,851,120 A * | 12/1998 | Sobhani | ............... | B60R 16/027 439/17 |
| 6,223,416 B1 * | 5/2001 | Boyd, Jr | ............... | H02K 1/165 29/596 |
| 6,489,702 B1 * | 12/2002 | Bartman | ............... | H01R 39/12 310/219 |
| 6,612,847 B2 * | 9/2003 | Canizales, Jr. | ...... | H01R 39/643 439/17 |
| 7,811,091 B2 * | 10/2010 | Koyama | .............. | H01R 39/643 439/17 |
| 10,385,856 B1 * | 8/2019 | Shakirov | ................ | H02K 5/132 |
| 2002/0034887 A1 * | 3/2002 | Dollhofer | ............ | H01R 39/643 439/17 |
| 2009/0239391 A1 * | 9/2009 | Singer | .................. | H01R 39/643 439/17 |
| 2014/0056721 A1 * | 2/2014 | Garrard | .................. | H02K 9/197 417/44.1 |

* cited by examiner

*Primary Examiner* — Harshad C Patel
(74) *Attorney, Agent, or Firm* — Chun-Ming Shih; HDLS IPR Services

(57) ABSTRACT

A rotating spindle capable of conductively contacting via bearings contains: a power supply module, a body, a first conductive assembly, and a second conductive assembly. The power supply module includes a first circular shell, an insulation element, a second circular shell, a first bearing, and a second bearing. The body is accommodated in the first circular shell and includes two elongated orifices, two guide orifices, and two electrode orifices. The first conductive assembly includes a first internal conductive wire, a first external conductive wire, and a first electrode. The first internal conductive wire is connected with the first electrode and extends out of the one guide orifice. The second conductive assembly includes a second internal conductive wire, a second external conductive wire, and a second electrode. The second internal conductive wire is connected with the first electrode and extends out of the other guide orifice.

7 Claims, 5 Drawing Sheets

ROTATING SPINDLE CAPABLE OF CONDUCTIVELY CONTACTING VIA BEARINGS

FIELD OF THE INVENTION

The present invention relates to a rotating spindle, and more particularly to an ultrasonic rotating spindle which is capable of conductively contacting via bearings.

BACKGROUND OF THE INVENTION

A conventional ultrasonic rotating spindle is applied to rotate at a high speed and to send power so that an ultrasonic tool is driven by the spindle to rotate synchronously and to machine a workpiece, wherein the power sent by the spindle causes high-frequency vibration to increase machining efficiency and to reduce abrasion.

The conventional ultrasonic rotating spindle contains a copper ring fixed on the spindle and configured to conduct power, a brush holder mounted on the copper ring, such that a carbon brush of the brush holder conducts an external power to the ultrasonic tool via the copper ring. However, the carbon brush wears the copper ring to produce toners depositing on the copper ring and the carbon brush, thus causing short circuit, poor conductivity, and invalid ultrasonic tool. In addition, a heat generates to reduce low conductivity because the carbon brush wears the copper ring.

The conductive module of the conventional ultrasonic rotating spindle contains an insulation material configured to isolate from the conventional ultrasonic rotating spindle, but the insulation material is plastic, thus reducing structural strength. Furthermore, the conductive module is fitted on the conventional ultrasonic rotating spindle to matingly mate with the conventional ultrasonic rotating spindle, and multiple through holes are defined between the conventional ultrasonic rotating spindle and the conductive module, in other words, the multiple through holes are defined on an inner wall of the conductive module so as to receive at least one conductive wire of the conductive module, and the at least one conductive wire is connected to a tool.

However, the at least one conductive wire is located on the inner wall of the conductive module, and the conductive module matingly mates with the conventional ultrasonic rotating spindle, thus having difficult connection and maintenance. Furthermore, it is troublesome to remove the conventional ultrasonic rotating spindle when desiring to maintain or replace the conductive module.

The present invention has arisen to mitigate and/or obviate the afore-described disadvantages.

SUMMARY OF THE INVENTION

A rotating spindle capable of conductively contacting via bearings provided by the present invention contains: a power supply module, a body, a first conductive assembly, and a second conductive assembly.

The power supply module includes a first circular shell, an insulation element, a second circular shell, a first bearing, and a second bearing. The first circular shell has a first hollow cylinder, a first protruded ridge formed on a first end of the first circular shell, a nut screwed on a second end of the first circular shell, and multiple receiving orifices axially defined on the first protruded ridge, an opening of a respective receiving orifice being axially located on the first circular shell, the insulation element having a second hollow cylinder, two slots axially formed on a peripheral wall of the insulation element, and the insulation element being fitted on the first circular shell, the second circular shell having a third hollow cylinder, a second protruded ridge extending inward from a first end of the second circular shell, a second end of the second circular shell being connected with a lid, the second circular shell being separately fitted on the first circular shell so as to define a receiving space between the second circular shell and the first circular shell. The first bearing has a first ring, a second ring, and multiple first balls defined between the first ring and the second ring. The second bearing has a third ring, a fourth ring, and multiple second balls defined between the third ring and the fourth ring. The first ring is adjacent to an inner wall of the second circular shell, the second ring is proximate to an outer wall of the insulation element, and the first ring is electrically connected with a first power cable. The third ring is adjacent to the inner wall of the second circular shell, the fourth ring is proximate to the outer wall of the insulation element, and the third ring is electrically connected with a second power cable.

The body is accommodated in the first circular shell of the power supply module, and the body includes two elongated orifices axially extending thereon, two guide orifices radially formed on the upper end of the body and communicating with the elongated orifices, and two electrode orifices defined on the lower end of the body and communicating with the two elongated orifices.

The first conductive assembly includes a first internal conductive wire, a first external conductive wire, and a first electrode received in one of the two electrode orifices. The first internal conductive wire is accommodated in one of the two elongated orifices of the body, a first end of the first internal conductive wire is connected with the first electrode, and a second end of the first internal conductive wire extends out of the one guide orifice. The first external conductive wire is received in one of the two slots of the insulation element and one of the multiple receiving orifices of the first circular shell, a first end of the first external conductive wire is connected with the second ring of the first bearing, and a second end of the first external conductive wire extends out the one receiving orifice of the first circular shell to connect with the first internal conductive wire.

The second conductive assembly including a second internal conductive wire, a second external conductive wire, and a second electrode received in the other electrode orifice. The second internal conductive wire is accommodated in the other elongated orifice of the body, a first end of the second internal conductive wire is connected with the first electrode, and a second end of the second internal conductive wire extends out of the other guide orifice. The second external conductive wire is received in the other slot of the insulation element and the other receiving orifice of the first circular shell, a first end of the second external conductive wire is connected with the fourth ring of the second bearing, and a second end of the second external conductive wire extends out of the power supply module to connect with the second internal conductive wire.

Thereby, the rotating spindle of the present invention has following effects:

1. The rotating spindle contains the first bearing and the second bearing which are used as an electrical circuit contacts, thus overcoming abrasion, carbon deposit, and low conductivity.

2. The rotating spindle contains the power supply module fitted on the body of the spindle by using the first circular shell made of metal, and the insulation element is configured to isolate the first bearing from the second bearing, such that the first bearing and the second bearing are insulatedly connected on the spindle, thus enhancing structural strength and buffer of the first bearing and the second bearing.

3. The rotating spindle contains the first external conductive wire and the second external conductive wire of the power supply module and the first internal conductive wire and the second internal conductive wire of the body which are connected on the upper or lower end of the power supply module outside the body, thus avoiding limited space and facilitating assembly, maintenance, and repair.

4. The rotating spindle capable contains the power supply module which is removed easily to avoid a removal of the body, thus facilitating replacement and maintenance.

DETAILED DESCRIPTION OF THE PREFERRED EMBODIMENTS

Figure 1:
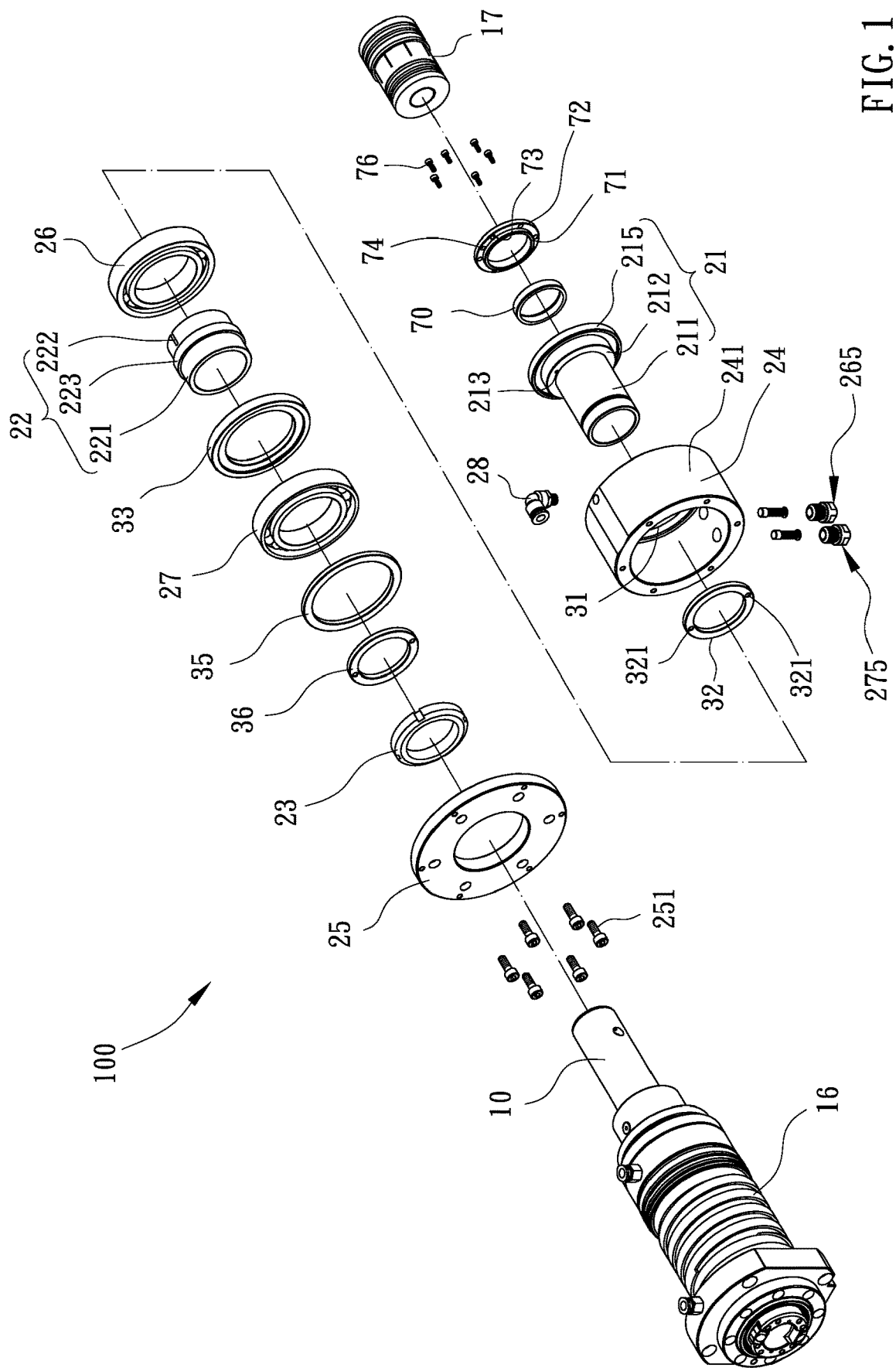
FIG. 1 is a perspective view showing the exploded components of a rotating spindle according to a preferred embodiment of the present invention.
Figure 2:
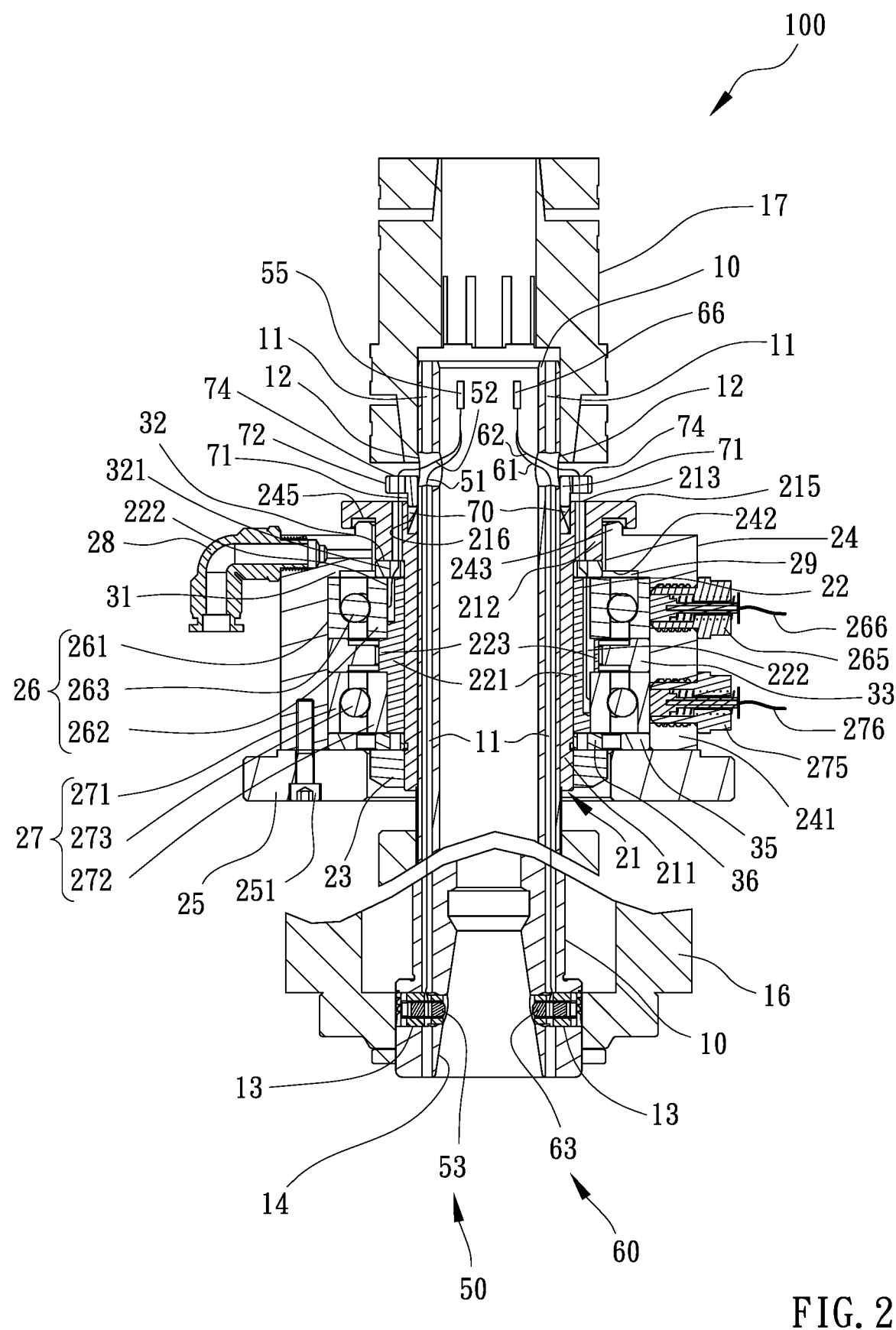
FIG. 2 is a cross sectional view showing the assembly of the rotating spindle according to the preferred embodiment of the present invention.

With reference to FIGS. 1-4, a rotating spindle 100 capable of conductively contacting via bearings according to a preferred embodiment of the present invention comprises: a body 10, a power supply module 20, a first conductive assembly 50, and a second conductive assembly 60.

The body 10 includes a conical orifice 14 defined therein, two elongated orifices 11 axially extending from an upper end of the body 10 to a lower end of the body 10, two guide orifices 12 radially formed on the upper end of the body 10 and communicating with the two elongated orifices 11, two electrode orifices 13 defined on the lower end of the body 10 and communicating with the two elongated orifices 11 and the conical orifice 14, a spindle sleeve 16, and a coupling 17, wherein the upper end of the body 10 is connected with an output (not shown) of a power device via the coupling 17 so as to drive the body 10 to rotate, and the spindle sleeve 16 is fitted on the lower end of the body 10. The rotating spindle 100 is applicable for machine tools, such as a drilling machine, a milling machine, a grinding machine, a lathe, and a gantry machining center.

Figure 3:
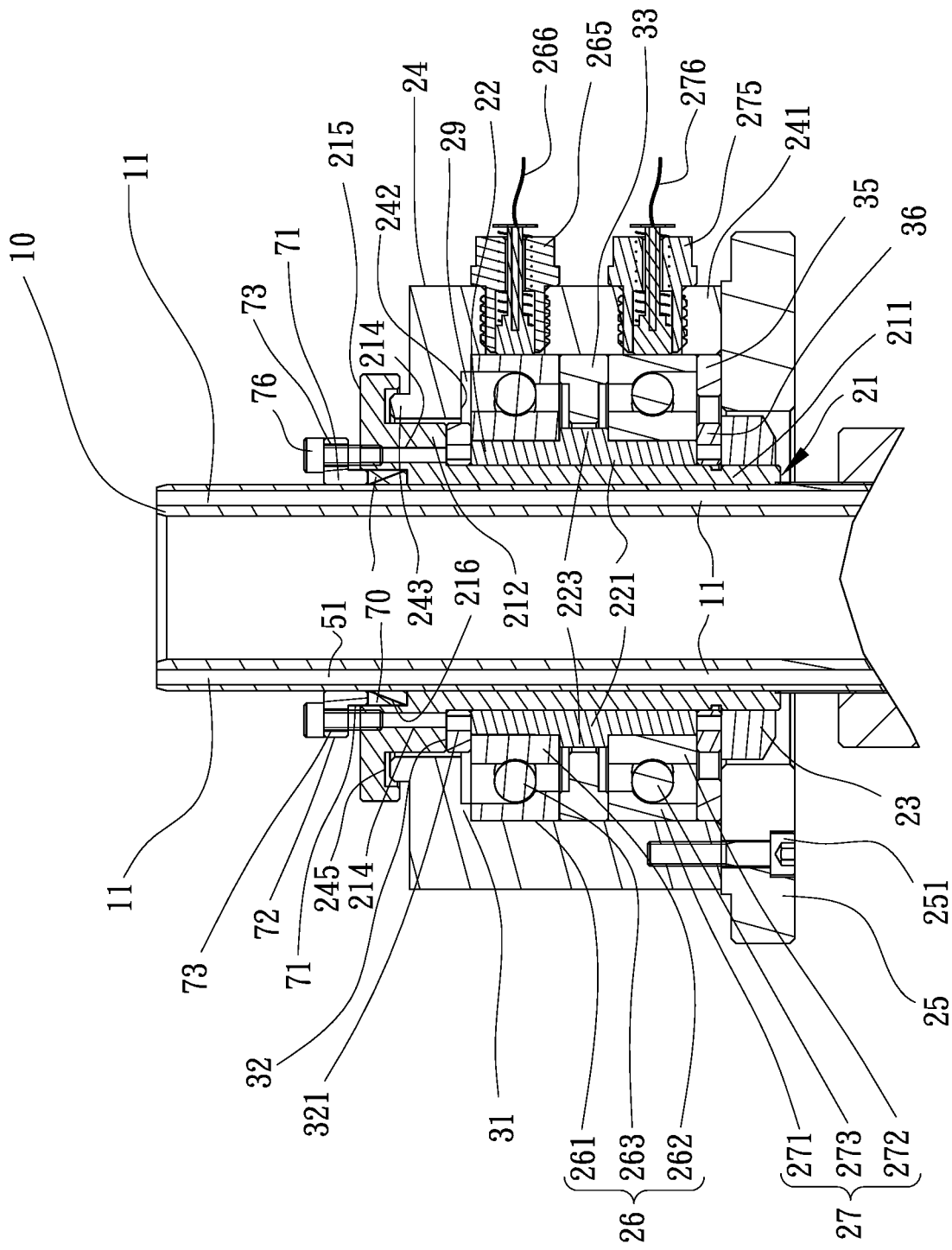
FIG. 3 is a cross sectional view showing the assembly of a part of the rotating spindle according to the preferred embodiment of the present invention.
Figure 4:
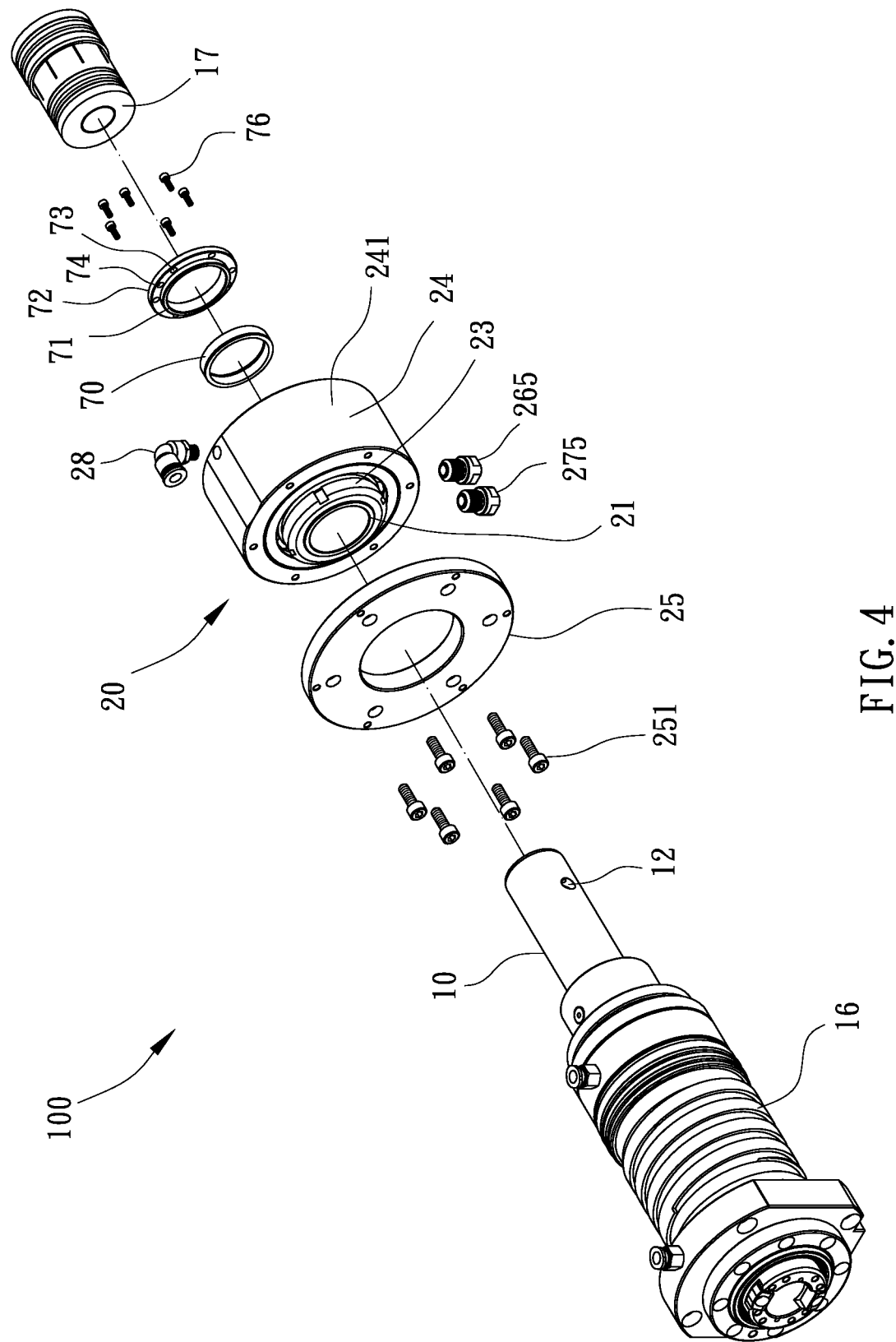
FIG. 4 is a perspective view showing the exploded components of a part of the rotating spindle according to the preferred embodiment of the present invention.

The power supply module 20 includes a first circular shell 21, an insulation element 22, a second circular shell 24, a first bearing 26, and a second bearing 27. The first circular shell 21 is made of metal and has a first hollow cylinder 211, a first protruded ridge 212 formed on a first end of the first circular shell 21, a nut 23 screwed on a second end of the first circular shell 21, a first rib 215 formed on the first protruded ridge 212, multiple receiving orifices 213 and multiple coupling orifices 214 which are axially defined on the first protruded ridge 212 (as shown in FIG. 3), and a recessed section 216 formed on an inner wall of the first end of the first circular shell 21, wherein the first circular shell 21 is fitted on an outer wall of the body 10, and an opening of a respective receiving orifice 213 is axially located on the first circular shell 21, wherein a vertical position of the respective receiving orifice 213 is lower than a vertical position of a respective guide orifice 12 of the body 10. The insulation element 22 has a second hollow cylinder 221, two slots 222 axially formed on a peripheral wall of the insulation element 22, and a second rib 223 formed on a middle portion of the peripheral wall of the insulation element 22, wherein the insulation element 22 is fitted on the first circular shell 21, at least one part of a respective slot 222 corresponds to at least one part of the respective receiving orifice 213. Preferably, the at least one part of the respective slot 222 linearly corresponds to the at least one part of the respective receiving orifice 213. The second circular shell 24 is made of plastic and has a third hollow cylinder 241, a second protruded ridge 242 extending inward from a first end of the second circular shell 24, a third protruded ridge 243 extending upward from a top of the second protruded ridge 242, wherein a second end of the second circular shell 24 is connected with a lid 25 by using multiple first screws 251, and the second circular shell 24 is separately fitted on the first circular shell 21 so as to define a receiving space 29 between the second circular shell 24 and the first circular shell 21, wherein the third protruded ridge 243 is opposite to the first rib 215 of the first circular shell 21 so as to define a labyrinth seal space 245, and the power supply module 20 is mounted on a machine (not shown) by way of the lid 25 or the second circular shell 24, and the second circular shell 24 further has a fixer 28 connected with the labyrinth seal space 245.

The first bearing 26 and the second bearing 27 are separately accommodated in the receiving space 29 by using the second rib 223, wherein the first bearing 26 is made of conductive material and has a first ring 261, a second ring 262, and multiple first balls 263 defined between the first ring 261 and the second ring 262, wherein a power is sent between the first ring 261 and the second ring 262 by rolling the multiple first balls 263, in other words, the power is sent to the second ring 262 from the first ring 261. The first ring 261 is adjacent to an inner wall of the second circular shell 24, and the second ring 262 is proximate to an outer wall of the insulation element 22. Furthermore, the first ring 261 is electrically connected with a first power cable 266 via a first electric connector 265, and the first electric connector 265 is coupled on the second circular shell 24.

The second bearing 27 is made of conductive material and has a third ring 271, a fourth ring 272, and multiple second balls 273 defined between the third ring 271 and the fourth ring 272, wherein the power is sent between the third ring 271 and the fourth ring 272 by rolling the multiple second balls 273, in other words, the power is sent to the fourth ring 272 from the third ring 271. The third ring 271 is adjacent to the inner wall of the second circular shell 24, and the fourth ring 272 is proximate to the outer wall of the insulation element 22. In addition, the third ring 271 is electrically connected with a second power cable 276 via a second electric connector 275, and the second electric connector 275 is connected to the second circular shell 24.

The power supply module 20 further includes a first insulated loop 31, a second insulated loop 32, a third insulated loop 33, a fourth insulated loop 35, and a fifth insulated loop 36.

The first insulated loop 31 is defined between the first ring 261 of the first bearing 26 and the second protruded ridge 242 of the second circular shell 24 and is configured to support and abut against the first ring 261 of the first bearing 26. In this embodiment, the first insulated loop 31 is one-piece formed with the second circular shell 24.

The second insulated loop 32 is defined between the first protruded ridge 212 of the first circular shell 21 and the second ring 262 of the first bearing 26 so as to separate the first protruded ridge 212 from the second ring 262, and the second insulated loop 32 has multiple accommodation apertures 321 defined thereon axially, wherein the multiple accommodation apertures 321 are opposite to the multiple receiving orifices 213 of the first circular shell 21 and the two slots 222 of the insulation element 22.

The third insulated loop 33 is axially located between the first ring 261 of the first bearing 26 and the third ring 271 of the second bearing 27 so as to separate the first ring 261 from the third ring 271.

The fourth insulated loop 35 is defined between the third ring 271 of the second bearing 27 and the lid 25 so as to separate the third ring 271 and the lid 25 and to support the third ring 271 of the second bearing 27.

The fifth insulated loop 36 is located between the fourth ring 272 of the second bearing 27 and the nut 23 so as to separate the fourth ring 272 and the nut 23 and to support the fourth ring 272 of the second bearing 27 and the nut 23.

The first bearing 26, the second bearing 27, the first insulated loop 31, the second insulated loop 32, the third insulated loop 33, the fourth insulated loop 35, and the fifth insulated loop 36 are connected to form the power supply module 20 by way of the first circular shell 21, the insulation element 22, the nut 23, the second circular shell 24, and the lid 25.

In this embodiment, the first conductive assembly 50 includes a first internal conductive wire 51, a first external conductive wire 52, and a first electrode 53 received in one of the two electrode orifices 13, the first internal conductive wire 51 is accommodated in one of the two elongated orifices 11 of the body 10, wherein a first end of the first internal conductive wire 51 is connected with the first electrode 53, and a second end of the first internal conductive wire 51 extends out of the one guide orifice 12, the first external conductive wire 52 is received in one of the two slots 222 of the insulation element 22, one of the multiple accommodation apertures 321 of the second insulated loop 32, and one of the multiple receiving orifices 213 of the first circular shell 21, wherein a first end of the first external conductive wire 52 is connected with the second ring 262 of the first bearing 26, and a second end of the first external conductive wire 52 extends out of the power supply module 20 via the one receiving orifice 213 of the first circular shell 21 and to connect with the first internal conductive wire 51 and the first external conductive wire 52 outside the body 10, thereafter a first head 55 of the first external conductive wire 52 and the first internal conductive wire 51 are accommodated in the body 10 from the one guide orifice 12, thus operating, connecting, and maintaining the rotating spindle 100 smoothly and conveniently.

In this embodiment, the second conductive assembly 60 includes a second internal conductive wire 61, a second external conductive wire 62, and a second electrode 63 received in the other electrode orifice 13, the second internal conductive wire 61 is accommodated in the other elongated orifice 11 of the body 10, wherein a first end of the second internal conductive wire 61 is connected with the first electrode 53, and a second end of the second internal conductive wire 61 extends out of the other guide orifice 12, wherein the second external conductive wire 62 is received in the other slot 222 of the insulation element 22, the other accommodation aperture 321 of the second insulated loop 32, and the other receiving orifice 213 of the first circular shell 21, wherein a first end of the second external conductive wire 62 is connected with the fourth ring 272 of the second bearing 27, and a second end of the second external conductive wire 62 extends out of the power supply module 20 via the other receiving orifice 213 of the first circular shell 21 and to connect with the second internal conductive wire 61 and the second external conductive wire 62 outside the body 10, thereafter a second head 55 of the second external conductive wire 62 and the second internal conductive wire 61 are accommodated in the body 10 from the other guide orifice 12, thus operating, connecting, and maintaining the rotating spindle 100 smoothly and conveniently.

The rotating spindle 100 further comprises: a contact loop 70 and a press loop 71, wherein the contact loop 70 is received in the recessed section 216 of the first circular shell 21 so as to fix the first circular shell 21 on the body 10. The press loop 71 has a protrusion 72, multiple fixing holes 73 and multiple guiding holes 74 which are defined on the protrusion 72, wherein multiple second screws 76 are inserted through the multiple fixing holes 73 to connect with the multiple coupling orifices 214 of the first circular shell 21 so that the press loop 71 abuts against the contact loop 70 securely, wherein multiple guiding holes 74 are configured to accommodate the first external conductive wire 52 and the second external conductive wire 62.

Figure 5:
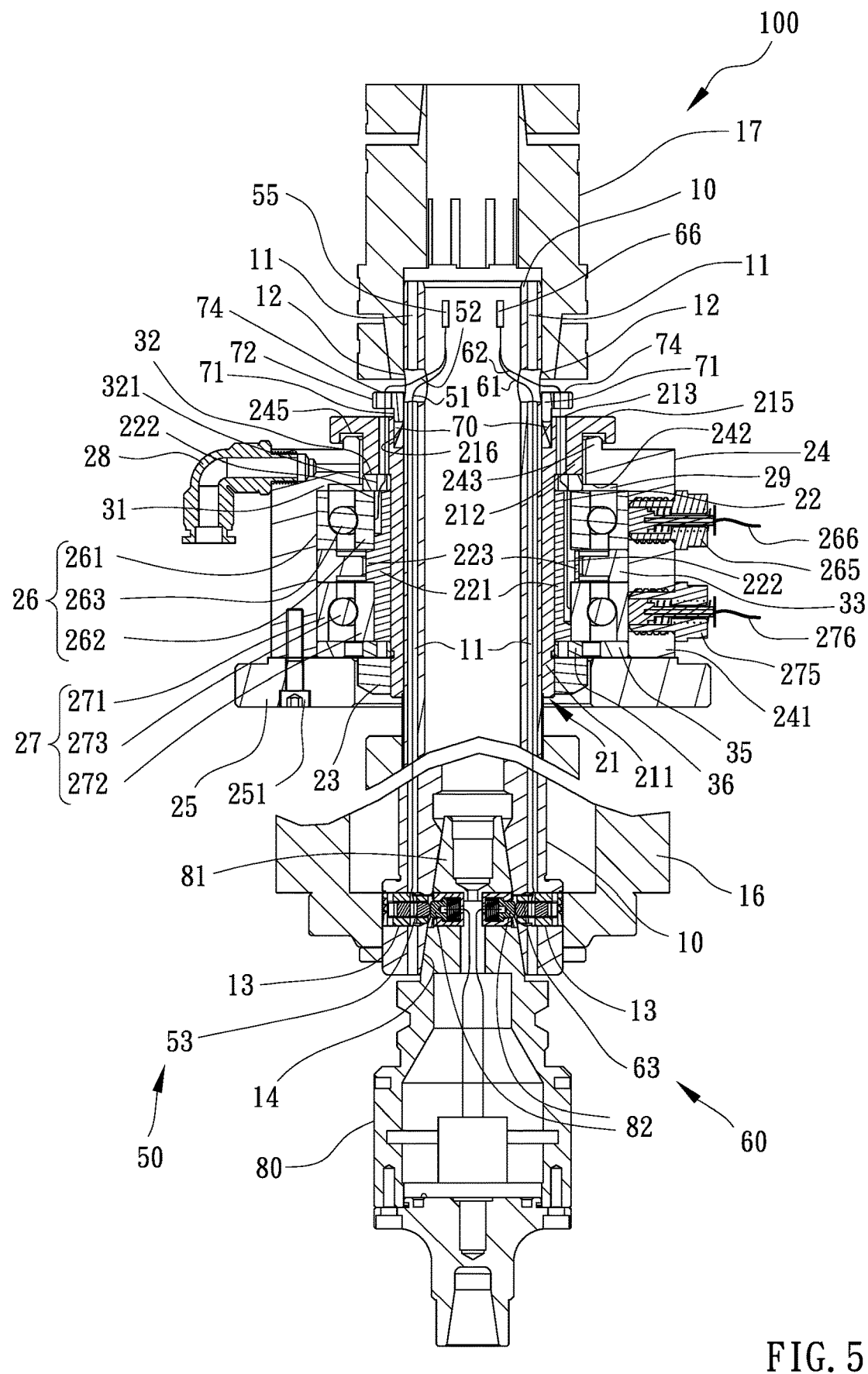
FIG. 5 is a cross sectional view showing the operation of the rotating spindle according to the preferred embodiment of the present invention.

In operation, as shown in FIG. 5, the conical orifice 14 of the body 10 accommodates an ultrasonic tool 80, wherein the ultrasonic tool 80 has a conical locating portion 81 and a pair of power connectors 82 arranged on the conical locating portion 81 to electrically contact with the first electrode 53 and the second electrode 63 so as to supply the power to the ultrasonic tool 80. When the body 10 rotates, the first circular shell 21, the insulation element 22, the second ring 262 of the first bearing 26, the fourth ring 272 of the second bearing 27, the nut 23, the contact loop 70, the press loop 71, the second insulated loop 32, the second rib 223, the fifth insulated loop 36, the first conductive assembly 50, the second conductive assembly 60, and the ultrasonic tool 80 rotate synchronously. It is to be noted that the second circular shell 24, the lid 25, the first ring 261 of the first bearing 26, the third ring 271 of the second bearing 27, the first insulated loop 31, the third insulated loop 33, the fourth insulated loop 35, the first electric connector 265, the second electric connector 275, the first power cable 266, and the second power cable 276 do not move, wherein the body 10 and the ultrasonic tool 80 are driven by an external power to revolve.

The fixer 28 is connected with an air source so that the air source is supplied to the labyrinth seal space 245, thus cleaning chips and avoiding dirt.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A rotating spindle capable of conductively contacting via bearings comprising:
   a power supply module including a first circular shell, an insulation element, a second circular shell, a first bearing, and a second bearing, the first circular shell having a first hollow cylinder, a first protruded ridge formed on a first end of the first circular shell, a nut screwed on a second end of the first circular shell, and multiple receiving orifices axially defined on the first protruded ridge, an opening of a respective receiving orifice being axially located on the first circular shell, the insulation element having a second hollow cylinder, two slots axially formed on a peripheral wall of the insulation element, and the insulation element being fitted on the first circular shell, the second circular shell having a third hollow cylinder, a second protruded ridge extending inward from a first end of the second circular shell, a second end of the second circular shell being connected with a lid, the second circular shell being separately fitted on the first circular shell so as to define a receiving space between the second circular shell and the first circular shell, wherein the first bearing has a first ring, a second ring, and multiple first balls defined between the first ring and the second ring, the second bearing has a third ring, a fourth ring, and multiple second balls defined between the third ring and the fourth ring, wherein the first ring is adjacent to an inner wall of the second circular shell, the second ring is proximate to an outer wall of the insulation element, and the first ring is electrically connected with a first power cable, wherein the third ring is adjacent to the inner wall of the second circular shell, the fourth ring is proximate to the outer wall of the insulation element, and the third ring is electrically connected with a second power cable;

a body accommodated in the first circular shell of the power supply module, and the body including two elongated orifices axially extending thereon, two guide orifices radially formed on the upper end of the body and communicating with the elongated orifices, and two electrode orifices defined on the lower end of the body and communicating with the two elongated orifices;

a first conductive assembly including a first internal conductive wire, a first external conductive wire, and a first electrode received in one of the two electrode orifices, wherein the first internal conductive wire is accommodated in one of the two elongated orifices of the body, a first end of the first internal conductive wire is connected with the first electrode, and a second end of the first internal conductive wire extends out of the one guide orifice, wherein the first external conductive wire is received in one of the two slots of the insulation element and one of the multiple receiving orifices of the first circular shell, a first end of the first external conductive wire is connected with the second ring of the first bearing, and a second end of the first external conductive wire extends out the one receiving orifice of the first circular shell to connect with the first internal conductive wire; and a second conductive assembly including a second internal conductive wire, a second external conductive wire, and a second electrode received in the other electrode orifice, wherein the second internal conductive wire is accommodated in the other elongated orifice of the body, a first end of the second internal conductive wire is connected with the first electrode, and a second end of the second internal conductive wire extends out of the other guide orifice, wherein the second external conductive wire is received in the other slot of the insulation element and the other receiving orifice of the first circular shell, a first end of the second external conductive wire is connected with the fourth ring of the second bearing, and a second end of the second external conductive wire extends out of the power supply module to connect with the second internal conductive wire.

2. The rotating spindle as claimed in claim 1, wherein an opening of a respective receiving orifice is axially located on the first circular shell, and a vertical position of the respective receiving orifice is lower than a vertical position of a respective guide orifice of the body.

3. The rotating spindle as claimed in claim 1, wherein the first electric connector is connected on the second circular shell and is electrically connected with a first power cable.

4. The rotating spindle as claimed in claim 1, wherein the first circular shell has a recessed section formed on an inner wall of the first end thereof, the recessed section accommodates a contact loop so as to fix the first circular shell on the body, and a press loop is mounted on the first circular shell to abuts against the contact loop securely.

5. The rotating spindle as claimed in claim 1 further comprising: a first insulated loop, a second insulated loop, a third insulated loop, a second rib, a fourth insulated loop, and a fifth insulated loop; wherein the first insulated loop is defined between the first ring of the first bearing and the second protruded ridge of the second circular shell; the second insulated loop is defined between the first protruded ridge of the first circular shell and the second ring of the first bearing; the third insulated loop is axially located between the first ring of the first bearing and the third ring of the second bearing; the second rib is defined between the second ring of the first bearing and the fourth ring of the second bearing; the fourth insulated loop is defined between the third ring of the second bearing and the lid so as to separate the third ring and the lid; and the fifth insulated loop is located between the fourth ring of the second bearing and the nut so as to separate the fourth ring and the nut.

6. The rotating spindle as claimed in claim 5, wherein the second insulated loop has multiple accommodation apertures defined thereon axially, and the multiple accommodation apertures are opposite to the multiple receiving orifices of the first circular shell and the two slots of the insulation element.

7. The rotating spindle as claimed in claim 5, wherein when the body rotates, the first circular shell, the insulation element, the second ring of the first bearing, the fourth ring of the second bearing, the nut, the second insulated loop, the second rib, the fifth insulated loop, the first conductive assembly, the second conductive assembly and the body rotate synchronously, but the second circular shell, the lid, the first ring of the first bearing, the third ring of the second bearing, the first insulated loop, the third insulated loop, the fourth insulated loop, and the second power cable do not move.

* * * * *